United States Patent [19]

Shimotsuma et al.

[11] 3,963,844

[45] June 15, 1976

[54] EXTRUSION-MOLDED ARTICLE HAVING GOOD THERMAL STABILITY

[75] Inventors: Sakae Shimotsuma, Atsugi; Masahiro Hosoi, Sagamihara; Takatoshi Kuratsuji, Iwakuni; Shoji Kawase, Iwakuni; Takeo Shima, Iwakuni, all of Japan

[73] Assignee: Teijin Limited, Osaka, Japan

[22] Filed: June 10, 1974

[21] Appl. No.: 478,101

[30] Foreign Application Priority Data

June 13, 1973 Japan.............................. 48-65779
Aug. 29, 1973 Japan.............................. 48-96229

[52] U.S. Cl. ............................. 428/36; 260/75 T; 428/333; 428/338; 428/339; 428/480
[51] Int. Cl.$^2$ ........................................... F16L 9/12
[58] Field of Search .............. 161/1, 165; 260/75 T; 428/36, 333, 338, 339, 480

[56] References Cited
UNITED STATES PATENTS

| | | | |
|---|---|---|---|
| 3,466,348 | 9/1969 | Wiener........................ | 260/75 T X |
| 3,637,910 | 1/1972 | Shima et al. ................. | 260/75 T X |
| 3,683,060 | 8/1972 | Tanabe et al. ............... | 260/75 T X |
| 3,816,486 | 6/1974 | Vail.............................. | 260/75 T |

FOREIGN PATENTS OR APPLICATIONS

| | | | |
|---|---|---|---|
| 604,073 | 6/1948 | United Kingdom............... | 260/75 T |

OTHER PUBLICATIONS

Jackson, Winston J. et al., Poly(tetramethylene terephthalate) and poly(tetramethylene naphthalenedicarboxylate) moldings, Polymer Science & Technology–P, (vol. 9 No. 7).

Kuhfuss, Herbert F., et al. Asbestos–reinforced poly(tetramethylenedicarboxylate) moldings, Polymer Science & Technology–P, (vol. 9 No. 7).

Duling, Irl N. Polyester preparation from naphthalene dicarboxylic acids and 1,2 propanediol, Chemical Abstracts (vol. 70).

Encyclopedia of Polymer Science & Technology, vol. 11, pp. 68–76, relied on, 1969.

*Primary Examiner*—William J. Van Balen
*Attorney, Agent, or Firm*—Sherman & Shalloway

[57] ABSTRACT

A thermally stable extrusion-molded article characterized by (1) consisting of a substantially linear polyester in which at least 90 mol% of the total recurring units consist of tetramethylene 2,6-naphthalate units, (2) having a density not in excess of 1.318, and (3) being in the unstretched state.

This article is prepared by extruding a melt of a substantially linear polyester in which at least 90 mol% of the total recurring units consist of tetramethylene 2,6-naphthalate units into the form of a molded structure, and cooling the extruded molded structure to room temperature, wherein during the period in which the extruded molded structure is cooled from at least 75%C. to room temperature, the cooling of the molded structure is performed rapidly so that the density of the molded structure does not exceed 1.318.

9 Claims, No Drawings

EXTRUSION-MOLDED ARTICLE HAVING GOOD THERMAL STABILITY

This invention relates to an extrusion-molded article which consists of a substantially linear polyester composed mainly of tetramethylene 2,6-naphthalate units and has good thermal stability in spite of being in the unstretched state, and to a process for its preparation. In particular, this invention relates to an unstretched extrusion-molded article in the form of films or tubes which has good thermal stability and electric insulation, and to a process for its preparation.

It is known that extruded films prepared from a polymeric composition based on a substantially linear crystalline polyester (for example, polyethylene terephthalate or polyethylene 2,6-naphthalate) have a number of superior characteristics, especially good thermal stability. These films, however, exhibit good thermal stability only when biaxially stretched and heat-set under proper conditions; in the unstretched state, these films have poor thermal stability, and cannot find utility as thermally stable films or electrically insulating materials.

We have now found unexpectedly from the prior common knowledge that an extrusion-molded article (e.g., films) of a substantially linear polyester whose recurring units consist mainly of tetramethylene 2,6-naphthalate units exhibits very good thermal stability despite its crystallinity, when its density does not exceed 1.318.

The "substantially linear polyester whose recurring units consist mainly of tetramethylene-2,6-naphthalate units" is a polyester in which at least 90 mol%, preferably at least 95 mol%, of the total recurring units consist of tetramethylene 2,6-naphthalate units, and the polyester is linear to such an extent that it can be extruded into the form of fibers or films.

The "density", as used in this application, is a value measured in accordance with the method of ASTM D1505-68 at 25°C. using a density gradient tube consisting of carbon tetrachloride-n-heptane and standard glass floats having various known densities. The polyester used for the measurement of density is free of any additives which may remain undissolved when the polyester is dissolved in a solvent.

The thermally stable unstretched extrusion-molded article of this invention which consists of a substantially linear polyester in which at least 90 mol% of the total recurring units consist of tetramethylene 2,6-naphthalate units, and which has a density not exceeding 1.318, preferably not exceeding 1.315 has good thermal stability as mentioned above in spite of being in the unstretched state. For various applications requiring high thermal stability, extrusion-molded articles of known polyesters, such as polyethylene terephthalate or polyethylene-2,6-naphthalate, must be those which have been subjected to treatments such as biaxial stretching or heat-treatment. In contrast, the extrusion-molded articles of this invention in the unstretched state can be used for various applications requiring thermal stability.

Preferably, the extrusion-molded articles of this invention have a reduced viscosity of at least 0.70, preferably at least 0.95. The "reduced viscosity", as used in the present application, is a value obtained by measuring the viscosity ($\eta$) of a sample polyester or its solution in o-chlorophenol in a concentration of 1.20 grams/100 ml. at a temperature of 35°C., and calculating the resulting viscosity value based on the following equation.

$$(\frac{\eta}{\eta_o} - 1)/C = \eta_{sp}/C$$

wherein
$\eta$ is the viscosity of the above solution measured under the above conditions,
$\eta_o$ is the viscosity of the solvent (o-chlorophenol) at 35°C.,
C is the concentration of the polyester expressed by 1.20 (g/100 ml.), and
$\eta_{sp}$ is the specific viscosity.

The extrusion-molded article of this invention can be advantageously prepared, for example, by extruding a melt of a substantially linear polyester in which at least 90 mol% of the total recurring units consist of tetramethylene 2,6-naphthalate units into the form of a molded article, and cooling the extruded molded article to room temperature in such a manner that during the period when the molded article is cooled from at least 75°C. to room temperature, preferably from at least 150°C. to room temperature, the cooling is carried out rapidly so that the density of the molded article does not exceed 1.318, preferably 1.315.

The polyester used in this invention in which the structural units consist mainly of tetramethylene 2,6-naphthalate is a crystalline polyester. When a melt of the polyester ester as extruded into the form of a molded article is cooled from 150°C. to room temperature, especially from 75°C. to room temperature, the degree of crystallinity of the polyester increases, and larger crystallites tend to be formed. Accordingly, in the present invention, it is recommended to cool the molded article as rapidly as possible in such a cooling period so as to provide a final extrusion-molded article having a density of 1.318, preferably 1.315.

It is advantageous that the period during which the molded article is cooled from at least 75°C. to room temperature, preferably from at least 150°C. to room temperature should not exceed, for example, 8 seconds, especially 5 seconds, most preferably 3 seconds.

When the cooling of the extruded molded article from at least 75°C. to room temperature, preferably from at least 150°C. to room temperature, is carried out slowly the degree of crystallinity of the polyester increases and larger crystallites are formed. Hence, the density of the extrusion-molded article exceeds 1.315, especially 1.318, and its transparency is also reduced.

In contrast, the unstretched extrusion-molded article of this invention obtained by the process of this invention in which the cooling is carried out rapidly during the abovementioned cooling period has a density not exceeding 1.318, preferably 1.315, and better transparency.

Advantageously, the extrusion-molded article of this invention should have a light transmittance at 650 nanometer ($10^{-9}$ meter), as measured on a sample extrusion-molded article of the polyester free from any solid additives and having a thickness of 150 microns, of at least 20%, preferably at least 35%.

An extrusion-molded article obtained by gradual cooling in the above-mentioned cooling period and having a density in excess of 1.318 has a low light transmittance, whereas the unstretched extrusion-molded article of this invention having a density not in excess of 1.318 and preferably having a light transmittance of at least 20%, preferably at least 35%, has the advantage of possessing good thermal stability and retaining the good light transmittance even when exposed to higher temperatures.

Thus, the extrusion-molded article of this invention is preferably obtained by rapid cooling during the above-mentioned cooling period. As a result, the suitable thickness of the molded article is 4 to 1000 microns, especially 4 to 450 microns, above all 10 to 300 microns, and the smaller the thickness, the more rapidly it can be cooled.

The base polymer used in this invention is any polyester whose structural units consist substantially of tetramethylene 2,6-naphthalate units, and includes not only polytetramethylene 2,6-naphthalate but also a modified tetramethylene 2,6-naphthalate polymer modified with a small amount (for example, not more than 10 mol%, preferably not more than 5 mol%) of a third component.

Generally, the polytetramethylene 2,6-naphthalate is produced by condensing naphthalene 2,6-dicarboxylic acid or its functional derivative with tetramethylene glycol or its functional derivative in the presence of a catalyst under suitable reaction conditions. The modified polymer may be a copolyester or mixed polyester obtained by adding at least one modifying component before the completion of polymerization for producing polytetramethylene 2,6-napthalate. Examples of suitable third components are dicarboxylic acids such as succinic acid, adipic acid, isophthalic acid, terephthalic acid or diphenylether dicarboxylic acid, lower alkyl esters of these dicarboxylic acids, and dihydric alcohols such as propylene glycol, trimethylene glycol, hexamethylene glycol, decamethylene glycol or neopentyl glycol. Furthermore, the polytetramethylene 2,6-naphthalate or its modified polymers may be those of which terminal hydroxyl and/or carboxyl groups are capped with a monofunctional compound such as benzoic acid, benzoylbenzoic acid, benzyloxybenzoic acid, or methoxypolyalkylene glycols. The polymers used in this invention may also be those which are modified with a very small amount of an ester-forming compound having at least three functional groups such as glycerine, pentaerythritol or trimesic acid to an extent such that a substantially linear copolymer can be obtained.

Another method for modification (mixing, copolymerization) that can be employed comprises mixing a small amount (for example, not more than 10 mol%, preferably not more than 5 mol%) of chips or powder of a polyester (additive polyester) other than the polytetramethylene 2,6-naphthalate with polytetramethylene 2,6-naphthalate, and thoroughly kneading this starting mixture at the time of melt-extrusion. Depending upon the type of the polyester, this method may result in the formation of a copolyester composed of units derived from the two.

The additive polyester may, for example, be a polyester having a melting point below the melt-extrusion temperature employed in the preparation of polymethylene 2,6-naphthalate, such as a polyester obtained from a combination of at least two compounds having a divalent ester-forming group. Specific examples are polyethylene terephthalate, polytetramethylene terephthalate, polyethylene isophthalate, polyethylene 2,6-naphthalate, polyhexamethylene 2,6-naphthalate, and polyhexaethylene adipate.

The polymer can contain a delusterant such as titanium dioxide, a stabilizer such as phosphoric acid, phosphorous acid or their esters, or hindered phenol, or a slippery agent such as finely divided silica or china clay.

The unstretched extrusion-molded article, such as films, composed of the polytetramethylene 2,6-naphthalate can be prepared by melting the polyester having a reduced viscosity of at least 0.70, preferably at least 0.95, and extruding the melt through a suitable extruder into any desired form such as films, ribbons or tubes. In view of the ease of molding operation, the polyesters having a reduced viscosity not exceeding 3.5, preferably not exceeding 2.0, are preferred.

The preparation of an unstretched film comprises drying the polymer at a temperature of 150° to 235°C., extruding the molten polymer through a die at a temperature of 265° to 330°C. into the form of a sheet or tube, and rapidly cooling and solidifying it on a casting drum or in water. The conditions under which the molten film is rapidly cooled and solidified restrict the density of the film.

For example, in order to obtain films having the above-specified density, it is desirable that the temperature of the casting drum should be as low as possible. As auxiliary means, there can be employed, for example, the blowing of air against the unstretched film at a high temperature, the cooling of the film by sprinkling water on it, the immersion of the film in water after or before casting, and the use of hold rollers held at low temperatures. These means are used either alone or in combination. Especially when thick films are to be obtained by casting, the use of the above auxiliary means is preferred. This method results in the formation of an unstretched film having a thickness of 4 to 1000 microns and a density of not more than 1.318.

Extrusion-molded articles in other forms can be prepared in accordance with the theory and direction given above with regard to the preparation of films.

The unstretched extrusion-molded articles of this invention consisting mainly of tetramethylene 2,6-naphthalate units have very good thermal stability unlike extrusion-molded articles of other polyesters. For example, in spite of having a softening point of about 245°C. which is lower than that of polyethylene terephthalate (about 261°C.) or polyethylene-2,6-naphthalate (about 272°C.), the extrusion-molded article of this invention exhibits reduced deterioration in mechanical and electrical properties when exposed to high temperatures, such as 150° to 235°C. for long periods of time, and has sufficient utilitarian value as a molded structure having superior thermal stability. In contrast, under the same conditions, the unstretched films of polyethylene-terephthalate or polyethylene-2,6-naphthalate exhibits a reduction especially in mechanical properties within very short periods of time; they become brittle and useless for practical purposes.

The extrusion-molded articles of this invention also have superior electrical properties, and can be used as excellent electrically insulating materials.

The extrusion-molded articles of this invention have a density not exceeding 1.318, preferably not exceeding 1.315, in their as-extruded and unstretched state. When these articles are heated to higher temperatures, their density exceeds 1.318, but they still retain the superior thermal stability and good transparency, and can find utility for various applications.

The following Examples and Comparative Examples illustrate the present invention in greater detail. It should be noted however that these Examples do not limit the present invention in any way.

The values of the properties given in the following Examples were measured by the following methods.

1. DENSITY

A density gradient tube was produced from carbon tetrachloride and n-heptane in accordance with the method of ASTM D1505-68. Using this density gradient tube and standard glass floats (product of Shibayama Scientific Co., Ltd.), the density of the film was measured at 25°C.

When the film contains additives (the apparent density of the film at this time is assumed to be $\rho a$), correction becomes necessary in order to remove the influences of the additives on the density of the film. For example, the correction can be made as follows:

A. A film containing a certain weight (W) of an additive is dissolved in o-chlorophenol.

B. The additive in the solution is precipitated to the bottom of a cell using a centrifugal separator with care taken to ensure that the viscosity of the solution does not become too high.

C. The supernantant liquid not containing the additive is drawn off, for example, by means of a fountainpen filler and dropped into a non-solvent for the polyester, such as methanol.

D. o-Chlorophenol is again added to the cell, and with good stirring, the additive is sufficiently suspended.

E. The procedure consisting of B to D above is repeated, until the addition of the supernatant liquid to the non-solvent causes no turbidity.

F. Then, the suspension is filtered by a glass filter whose weight ($W_o$) has been measured in advance (the grade of the filter is chosen according to the particle size of the additive) to separate the additive by filtration.

G. The additive on the filter is thoroughly washed with a nonsolvent, for example with methanol, and dried together with the filter.

H. The weight $W_1$ of the filter is measured, and the content of additive c is calculated as $$c = \frac{W_1 - W_0}{W - (W_1 - W_0)}.$$

I. Then, the density of the additive obtained by the above procedure H is measured. For example, the additive is placed in a pycnometer, and ethyl alcohol is filled in it. At reduced pressure, the additive is thoroughly deaerated, and then at 20°C. the weight of the pycnometer is measured. On the other hand, ethyl alcohol alone is placed in a pycnometer, and the weight of the pycnometer is measured at 20°C. Then, by a usual method, the density $\rho c$ of the additive is calculated.

J. $\rho\theta$ is corrected, and the true density ($\rho$) of the film is calculated in accordance with the following equation.

$$\rho = \frac{\rho a \rho c \ [W - (W_1 - W_0)]}{\rho c W - \rho a (W_1 - W_0)}$$

2. TENSILE STRENGTH AND ELONGATION AT BREAK

The tensile mechanical properties are determined in an atmosphere kept at a relative humidity of 65% and a temperature of 23°C. by means of an Instron type tensile tester under the following conditions.

| | |
|---|---|
| Sample form: | (15 cm × 1 cm) |
| Chuck distance: | 10 cm |
| Pulling rate: | 10 cm/min. |

The sample was cut out from the film so that the longitudinal direction of the sample corresponded with that of the film.

3. DIELECTRIC BREAKDOWN VOLTAGE

Measured in accordance with the method of JIS C2318 using a disc electrode with a diameter of 25 mm and elevating the voltage at a rate of 1 KV/sec.

4. METHOD FOR HEAT DETERIORATING THE FILM

Samples of the form described in paragraph 2 above are cut out so that the longitudinal direction of the samples correspond with those of the film. They are placed in a gear oven kept at a predetermined temperature, and taken out after a predetermined period of time.

5. REDUCED VISCOSITY ($\eta_{sp}/c$)

A dried polymer or stretched film is dissolved in o-chlorophenol in a concentration of 1.2 gr/dl. at 140°C. for 0.5 hours, and the viscosity of the solution is measured at 35°C. using an Ubbelohde type viscosimeter. The reduced viscosity is calculated from the following equation.

$$\eta_{sp}/c = (\frac{\eta}{\eta_o} - 1)/c$$

wherein
  $\eta$ is the viscosity of the solution,
  $\eta_o$ is the viscosity of the solvent, and
  c is the concentration of the polyester in the solution in dl/gr.

6. LIGHT TRANSMITTANCE

Measured at room temperature at a wavelength of 650 nm using an ultraviolet spectral photometer (UV-200, the product of Shimazu Seisakusho, Japan).

As regards samples having thickness other than 150 microns, the light transmittance is calculated as 150-micron thickness in accordance with the following equation.

$$\text{Light transmittance calculated as 150-micron thickness} = \exp(\frac{150}{d}\ln T)$$

wherein
  d is the thickness of the sample in microns, and
  T is the light transmittance of the sample. When the sample contains additives, the light transmittance is corrected as follows:

1. The value t is first calculated from the following equation.

$$t = \exp\left(\frac{150}{d'}\ln T'\right)$$

wherein
T' is the light transmittance of the above molded article, and
d' is the thickness of the sample in microns.

2. Then, the sample is placed in o-chlorophenol and dissolved in a concentration of 1.00 gr/100 ml., and when the additive is in the suspended state, the suspension is placed in a quartz or glass cell having an optical length of 1.0 cm and the light transmittance is measured. The light transmittance of a sample having a thickness of 150 microns and being free from additives is calculated in accordance with the following equation.

Light transmittance of the sample free from additives and having a thickness of 150 microns = exp (lnt − 1.5 lnT$_s$)

wherein T$_s$ is the light transmittance measured above in the cell.

EXAMPLE 1 AND COMPARATIVE EXAMPLE 1

Polytetramethylene 2,6-naphthalate having a reduced viscosity of 1.18 was dried at 175°C. for 2 hours, and melt-extruded at 278°C. through a T-die onto a casting drum held at 11°C., where it was rapidly cooled and solidified to form an unstretched film having a thickness of 160 microns and a reduced viscosity of 1.09 (film 1).

Polyethylene terephthalate having a reduced viscosity of 1.83 was dried at 175°C. for 2 hours, and melt-extruded at 285°C. through a T-die onto a casting drum held at 11°C., where it was rapidly cooled and solidified to form an unstretched film having a thickness of 165 microns (film 2).

Furthermore, polyethylene 2,6-naphthalate having a reduced viscosity of 1.91 was dried at 175°C. for 2 hours, and melt-extruded at 295°C. through a T-die onto a casting drum held at 11°C., where it was rapidly cooled and solidified to form an unstretched film having a thickness of 160 microns (film 3).

Each of these films was heat-deteriorated at 160°C. and 200°C. for the time periods specified in Table 1, and then their properties were measured. The results are shown in Table 1.

Table 1

| Run Nos. | Film number and properties measured | Before deterioration | After deterioration at 160°C. for 100 hours | After deterioration at 160°C. for 1000 hours | After deterioration at 200°C. for 100 hours | After deterioration at 200°C. for 200 hours |
|---|---|---|---|---|---|---|
| 1 | Film 1 | | | | | |
| | Elongation at break (%) | 310 | 63 | 39 | 25 | 24 |
| | Tensile strength (Kg/cm²) | 710 | 710 | 700 | 690 | 730 |
| | Dielectric breakdown voltage (KV/mm) | 147 | 146 | 150 | 148 | 145 |
| | Density (g/cm³) | 1.301 | 1.317 | 1.319 | 1.326 | 1.328 |
| | Light transmittance (%) | 65 | | 40 | | 32 |
| 2 (comparison) | Film 2 | | | | | |
| | Elongation at break (%) | 15 | Not measurable because of considerable degeneration | | Not measurable because of considerable degeneration | |
| | Tensile strength (Kg/cm²) | 590 | | | | |
| | Dielectric breakdown voltage (KV/mm) | 138 | | | | |
| | Density (g/cm³) | 1.343 | | | | |
| 3 (comparison) | Film 3 | | | | | |
| | Elongation at break (%) | 140 | Not measurable because of considerable degeneration | | Not measurable because of considerable degeneration | |
| | Tensile strength (Kg/cm²) | 730 | | | | |
| | Dielectric breakdown voltage (KV/mm) | 143 | | | | |
| | Density (g/cm³) | 1.337 | | | | |

Run No. 1 was an example of this invention, and Runs Nos. 2 and 3 are comparative examples.

As is seen from Table 1, the film 1 (the unstretched film of polytetramethylene 2,6-naphthalate in accordance with the present invention) has very good thermal stability. The elongation of this unstretched film after the deterioration was considerably reduced, but was still maintained at a sufficiently practicable level.

EXAMPLE 2 AND COMPARATIVE EXAMPLE 2

Polytetramethylene 2,6-naphthalate having a reduced viscosity of 1.08 was dried at 170°C. for 3 hours, and melt-extruded at 280°C. through a T-die onto a casting drum kept at −13°C. to 71°C., where it was rapidly cooled and solidified to form unstretched films each having a thickness of 195 microns and a reduced viscosity of 1.01. In Run No. 8, the cooling of the film was promoted by blowing air against the cast film on the casting drum using an air knife. Each of the films so obtained was heat-deteriorated in the air at 200°C. for 100 hours. Then, the properties of the deteriorated films were measured.

The results obtained are shown in Table 2.

Table 2

| Runs Nos. | Temperature of the casting drum (°C.) | Density of the film | Before deterioration* Light transmittance (%) | Before deterioration* Elongation at break | Before deterioration* Tensile strength | BDV** | After deterioration* Light transmittance (%) | After deterioration* Elongation at break | After deterioration* Tensile strength | BDV** |
|---|---|---|---|---|---|---|---|---|---|---|
| 4 | −13 | 1.293 | 88 | 410 | 690 | 141 | 78 | 27 | 700 | 146 |
| 5 | 1 | 1.297 | 87 | 379 | 710 | 148 | 76 | 26 | 720 | 145 |
| 6 | 15 | 1.305 | 61 | 353 | 700 | 140 | 45 | 17 | 690 | 142 |

Table 2-continued

| Runs Nos. | Temperature of the casting drum (°C.) | Density of the film | Before deterioration* | | | | After deterioration* | | | |
|---|---|---|---|---|---|---|---|---|---|---|
| | | | Light transmittance (%) | Elongation at break | Tensile strength | BDV** | Light transmittance (%) | Elongation at break | Tensile strength | BDV** |
| 7 (comparison) | 26 | 1.320 | 15 | 233 | 730 | 143 | 11 | 5 | 710 | 138 |
| 8 | 26 | 1.315 | 37 | 383 | 700 | 140 | 31 | 17 | 730 | 143 |
| 9 (comparison) | 71 | 1.322 | 7 | 175 | 720 | 146 | 4 | 2 | 720 | 140 |

*The units are the same as in Table 1.
**BDV stands for dielectric breakdown voltage Runs Nos. 4 5, 6 and 8 were all examples of this invention, and Runs Nos. 7 and 9 were comparisons. In Run No. 8, the temperature of the casting drum was equal to that used in Run No. 7, but by blowing air against the film using an air knife to promote the cooling, a film of low density was obtained. As can be seen from Table 2, the films in the examples exhibited superior thermal stability, but the thermal stability of the films in the comparisons were inferior.

EXAMPLE 3

Polytetramethylene 2,6-naphthalate having a reduced viscosity of 1.08 was dried at 180°C. for 2 hours, and melt-extruded at 280°C. through a ring die into a tubular form with a diameter of 15 mm. Then, the tubular film was either poured into cold water (Run No. 10), or poured into dichloroethane cooled with dry ice (Run No. 11). Each of the tubular films had a thickness of about 435 microns. These tubes all had a reduced viscosity of 0.99. Each of the tubes obtained was heat deteriorated at 200°C. for 100 hours, and then the physical properties of the tubes were measured. The results are shown in Table 3.

Table 3

| Run No. | Properties before deterioration* | | | | Properties after deterioration* | |
|---|---|---|---|---|---|---|
| | Density | Light transmittance (%) | Elongation at break | Tensile strength | Elongation at break | Tensile strength |
| 10 | 1.303 | 27 | 31 | 710 | 12 | 730 |
| 11 | 1.277 | 41 | 39 | 700 | 13 | 690 |

*The units are the same as in Table 1.

The results in Table 3 show that all of the tubes had sufficiently useful properties even after the deterioration.

EXAMPLE 4

A copolymer derived from tetramethylene 2,6-naphthalate structural units and 4.7 mol% of ethylene 2,6-naphthalate structural units was dried at 170°C. for 3 hours, and then melt-extruded at 279°C. through a T-die onto a casting drum kept at 9°C. At the same time, air was blown against the casting drum using an air knife to form an unstretched film. The film had a reduced viscosity of 0.96, and a light transmittance of 39%. The film was heat-deteriorated at 200°C. for 100 hours in the same way as in Example 3. The properties of the film were measured, and the results are shown in Table 4.

Table 4

| Run No. | Properties before deterioration* | | | Properties after deterioration* | |
|---|---|---|---|---|---|
| | Density | Elongation at break | Tensile strength | Elongation at break | Tensile strength |
| 12 | 1.312 | 45 | 720 | 11 | 730 |

*The units are the same as in Table 1.

The results of Table 4 show that after the deterioration, the film still had properties suitable for use as an electrically insulating material.

EXAMPLE 5

Polytetramethylene 2,6-naphthalate having a reduced viscosity of 1.00 and polyethylene terephthalate having a reduced viscosity of 1.85 were blended at a weight ratio of 96.5:3.5. The blend was dried at 180°C. for 2 hours, and melt-extruded at 281°C. onto a casting drum held at 5°C. to form an unstretched film having a thickness of 250 microns, a reduced viscosity of 0.95, and a light transmittance of 73%. The film was heat-deteriorated at 200°C. for 100 hours in the same way as in Example 3. Then, the properties of the film were measured, and the results are shown in Table 5.

Table 5

| Run No. | Properties before deterioration* | | | | Properties after deterioration* | | | |
|---|---|---|---|---|---|---|---|---|
| | Density | Elongation at break | Tensile strength | BDV | Elongation at break | Tensile strength | BDV | Light transmittance |
| 13 | 1.299 | 157 | 710 | 136 | 17 | 680 | 139 | 57 |

*The units are the same as in Tables 1 and 2.

The results of Table 5 show that even after the deterioration, the film still had properties sufficiently suitable for use as an electrically insulating material.

What we claim is:

1. A thermally stable unstretched extrusion-molded article comprising an extrusion-molded, unstretched substantially linear polyester in which at least 90 mol% of the total recurring units consist of tetramethylene 2,6-naphthalate units, having a density not in excess of 1.318 g/cm$^3$.

2. The extrusion-molded article of claim 1 wherein said polyester has a reduced viscosity of at least 0.70, the reduced viscosity being calculated on the basis of the viscosity value measured on a solution of the polymer in o-chlorophenol in a concentration of 1.20 grams/100 ml. at 35°C.

3. The extrusion-molded article of claim 1 wherein said polyester has a reduced viscosity of at least 0.95, the reduced viscosity being calculated on the basis of the viscosity value measured on a solution of the polymer in o-chlorophenol in a concentration of 1.20 grams/100 ml. at 35°C.

4. The extrusion-molded article of claim 1 which has a thickness of 4 to 1000 microns.

5. The extrusion-molded article of claim 1 which has a transmittance of light of wavelength 650 nanometer of at least 20%, the transmittance being determined with respect to a sample having a thickness of 150 microns and being free from any additive.

6. The extrusion-molded article of claim 1 which is in the form of a film.

7. The extrusion-molded article of claim 1 which is in the form of a tube.

8. The extrusion-molded article of claim 1 which is in the form of film or tube as an electrically insulating material.

9. The extrusion-molded article of claim 1 wherein at least 95 mol% of the total recurring units of said polyester consist of tetramethylene 2,6-naphthalate units.

* * * * *